(12) United States Patent
Blice et al.

(10) Patent No.: US 11,243,675 B1
(45) Date of Patent: Feb. 8, 2022

(54) METHOD AND SYSTEM FOR ENRICHING CROSS-BRAND USER IN INTERFACE EXPERIENCES

(71) Applicant: Honda Motor Co., Ltd., Tokyo (JP)

(72) Inventors: Mark A. Blice, Huntington Beach, CA (US); Mohitash Brijwasi, La Palma, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/174,982

(22) Filed: Feb. 12, 2021

(51) Int. Cl.
*G06F 3/048* (2013.01)
*G06F 3/0484* (2013.01)
*G06F 3/0482* (2013.01)
*G06F 3/0481* (2013.01)

(52) U.S. Cl.
CPC ........ *G06F 3/04845* (2013.01); *G06F 3/0482* (2013.01); *G06F 3/04817* (2013.01)

(58) Field of Classification Search
CPC . G06F 3/04817; G06F 3/0482; G06F 3/04845
See application file for complete search history.

(56) References Cited

U.S. PATENT DOCUMENTS

| | | | |
|---|---|---|---|
| 6,980,967 B1 | 12/2005 | Mela | |
| 7,134,090 B2 | 11/2006 | Kodosky et al. | |
| 7,173,177 B1 | 2/2007 | Gould et al. | |
| 7,642,443 B2 | 1/2010 | Gould et al. | |
| 7,644,154 B2 | 1/2010 | Tagawa et al. | |
| 8,140,601 B2 | 3/2012 | Plastina et al. | |
| 8,412,594 B2 | 4/2013 | Kundu | |
| 8,522,165 B2 | 8/2013 | Cameron et al. | |
| 8,706,777 B2 | 4/2014 | Sloo | |
| 8,788,365 B2 | 7/2014 | Paul et al. | |
| 9,590,427 B2 | 3/2017 | Davis et al. | |
| 9,665,900 B1 | 5/2017 | Claeson et al. | |
| 9,952,750 B2 | 4/2018 | Bertram et al. | |
| 10,203,982 B2 | 2/2019 | Meng | |
| 10,319,015 B2 | 6/2019 | Ogawa | |
| 2003/0019583 A1 | 1/2003 | Kopacz et al. | |
| 2004/0104931 A1* | 6/2004 | Schmitt | G06F 3/00 715/744 |
| 2005/0012574 A1 | 1/2005 | Drevon et al. | |
| 2010/0003077 A1 | 1/2010 | Kelley | |

(Continued)

FOREIGN PATENT DOCUMENTS

WO 2007/021038 A1 2/2007

*Primary Examiner* — Claudia Dragoescu
(74) *Attorney, Agent, or Firm* — Plumsea Law Group, LLC

(57) ABSTRACT

A system and method for modifying the appearance of graphical elements in an application ("app") to promote cross-brand synergy for a company is described. In one embodiment, the app displays a top-level banner menu that includes a plurality of selectable icons. Each selectable icon serves as a link to a landing page for a specific product group ("brand") of the company. When the user initially accesses the app, each of the selectable icons appear greyed-out. When a user selects one of the icons in order to navigate to the landing page for the corresponding product group, the app responds by altering the appearance of that icon from a greyscale to a chromatic format. In some cases, the color applied to the icon corresponds to the color associated with the selected brand.

20 Claims, 13 Drawing Sheets

(56) References Cited

U.S. PATENT DOCUMENTS

| | | | |
|---|---|---|---|
| 2011/0202400 A1* | 8/2011 | Bedard | G06Q 30/0251 |
| | | | 705/14.19 |
| 2012/0054060 A1* | 3/2012 | Kundu | G06Q 30/0643 |
| | | | 705/26.5 |
| 2013/0018787 A1 | 1/2013 | Andrews et al. | |
| 2013/0080966 A1* | 3/2013 | Kikin-Gil | G06F 3/0483 |
| | | | 715/776 |
| 2016/0013232 A1 | 1/2016 | Tu et al. | |
| 2016/0085428 A1* | 3/2016 | Ashby | G06F 16/958 |
| | | | 715/738 |
| 2017/0102840 A1* | 4/2017 | Singhal | H04L 67/02 |

* cited by examiner

METHOD AND SYSTEM FOR ENRICHING CROSS-BRAND USER IN INTERFACE EXPERIENCES

BACKGROUND

The embodiments relate generally to methods and systems for adjusting the stylistic appearance of elements across multiple application channels presented to a user on a screen via a graphical user interface ("GUI").

Multi-business firms or vertical integration companies in a supply chain are united through a common owner (e.g., a conglomerate). In larger enterprises, each department or team can operate as a separate and distinct group or sub-company that pursues and develops its own set of goals and initiatives. These companies exist across many industries such as industrial goods, finance, telecommunications, etc. In some cases, these companies may desire to realize a synergy between their sub-companies (cross-business synergies) in order to increase corporate performance. In addition to raising their efficiency and reducing their costs, companies increasingly focusing on achieving profitable returns have found that collaborating across their internal businesses is a major lever of growth, particularly in saturated markets. In other words, it can often work to a company's advantage to align the strategies of two or more of its businesses. For example, such an approach can reduce interunit competition as well as offer a powerful and effective tactic in countering competitive threats. In particular, marketing strategies for multiple brands can benefit from cross-business synergy. However, implementation of this approach through online media marketing has been challenging.

Currently, many conglomerates include brand divisions that operate independently, resulting in separated responsibility for marketing design for different product groups and a lost opportunity for cross-promotion. Such a separation can also be associated with an erratic, inconsistent user experience for customers attempting to engage with two or more brands owned by the same enterprise, and lead to a potential disconnect with customers. It is therefore highly desirable for a multi-business firm to employ a synergistic, unified marketing approach to enhance the promotion of each of its brands while ensuring each individual brand retains its own unique identity that is readily and consistently recognizable by its customers.

There is a need in the art for a system and method that addresses the shortcomings discussed above.

SUMMARY

Embodiments provide methods and systems for facilitating intercompany collaboration via synergistic marketing and cross-brand promotion.

In one aspect, a method for modifying an appearance of graphical elements of an application in response to user behavior includes a step of displaying a plurality of selectable icons, where each selectable icon represents a link to a landing page for a specific product group of a company, and the plurality of selectable icons including a first selectable icon. The method also includes steps of receiving, via the application, a first user input corresponding to a selection of the first selectable icon representing a first product group, and automatically altering, in response to the first user input, an appearance of the first selectable icon from a first contrast level to a second contrast level, the second contrast level being greater than the first contrast level.

Another aspect provides a method for adjusting an appearance of graphical elements of an application in response to a user inventory profile. The method may include steps of receiving, via the application, a first user login for a first user account, and initiating a first access session in response to the first user login, the first access session linked to the first user account. The method also includes a step of automatically accessing an inventory profile for the first user account and determining that the inventory profile includes a first product associated with a first product group of the company. The method further includes a step of displaying a plurality of selectable icons, each selectable icon representing a link to a landing page for a specific product group of a company, the plurality of selectable icons including a first selectable icon corresponding to the first product group and a second selectable icon corresponding to a second product group. In addition, the method includes automatically adjusting, in response to determining the inventory profile includes the first product, an appearance of the second selectable icon such that the second selectable icon has a greater typographical emphasis than the first selectable icon.

Another aspect provides a system for adjusting an appearance of graphical elements of an application in response to user behavior. The system includes comprising a processor and machine-readable media including instructions which, when executed by the processor, cause the processor to display a plurality of selectable icons, where each selectable icon representing a link to a landing page for a specific product group of a company, and the plurality of selectable icons including a first selectable icon. In addition, the instructions cause the processor to receive, via the application, a first user input corresponding to a selection of the first selectable icon representing a first product group. Finally, the instructions cause the processor to automatically alter, in response to the first user input, an appearance of the first selectable icon from a first contrast level to a second contrast level, the second contrast level being greater than the first contrast level.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1A:
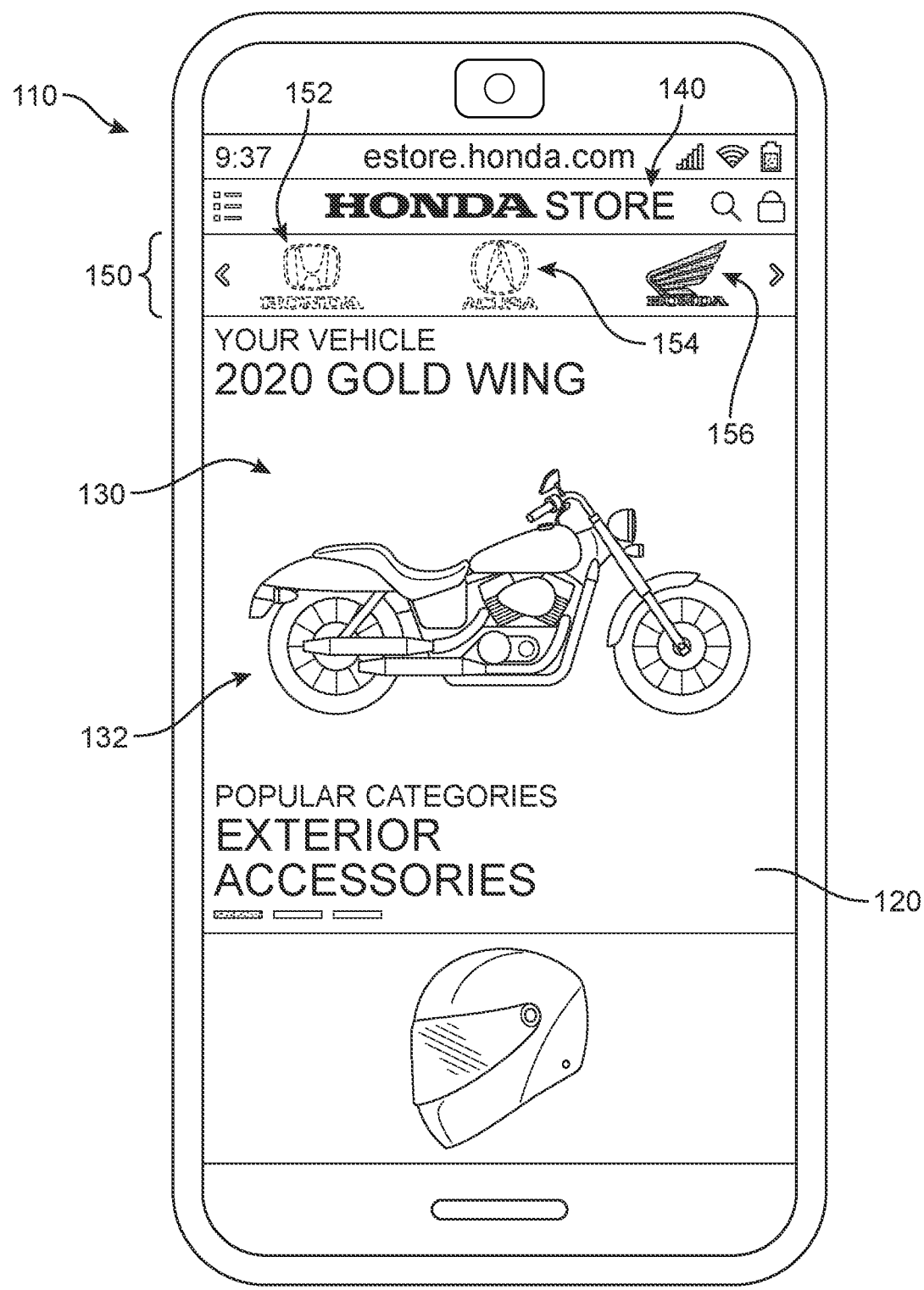
FIGS. 1A-1C present a sequence in which an application displays a series of selectable icons, and where the appearance of the selectable icons is responsive to user in-app behavior, according to an embodiment.

Embodiments provide methods and systems for a web-based application ("app") configured to implement and realize cross-brand synergy while facilitating and promoting brand differentiation. In one embodiment, the proposed system provides multi-business firms with a single app configured to present a unified user interface (UI) for multiple, discrete product groups ("brands") or sub-companies collectively owned or otherwise managed by the firm. For example, the UI presents a consistent appearance and arrangement across the app for each of its brands while also preserving the distinct identity and style of each brand. The app supports and enhances customer engagement by providing a consistent, uniform user experience that simplifies, streamlines, and encourages navigation across a plurality of brands while allowing each brand to retain its own distinctive style.

Throughout this disclosure, references to components or modules generally refer to items that logically can be grouped together to perform a function or group of related functions. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event" refers to an event (or specific sequence of events) associated with a particular input or use of an application via an interface, which can trigger a change in the display of the application. Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

Furthermore, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Figure 1B:
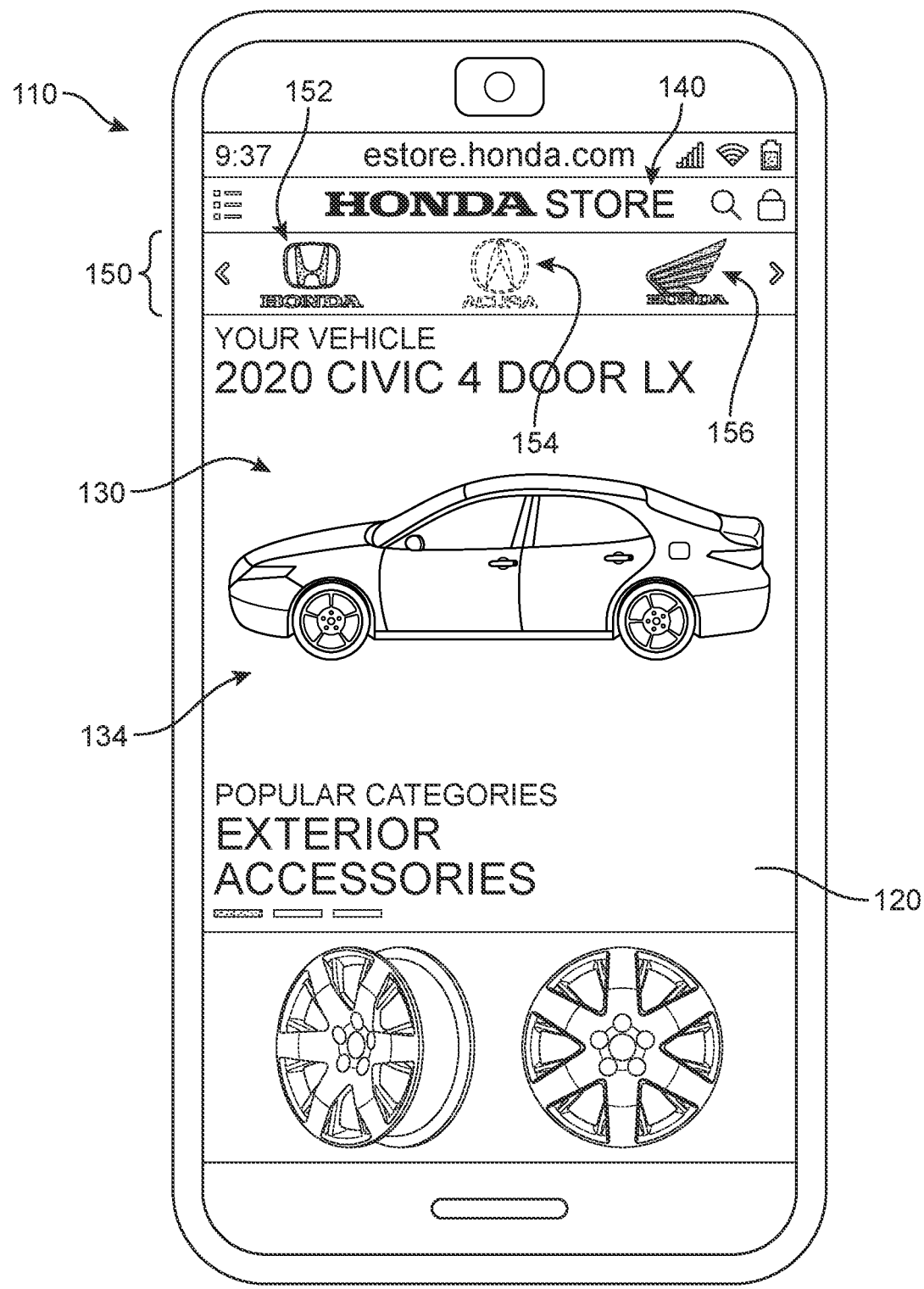
Figure 1C:
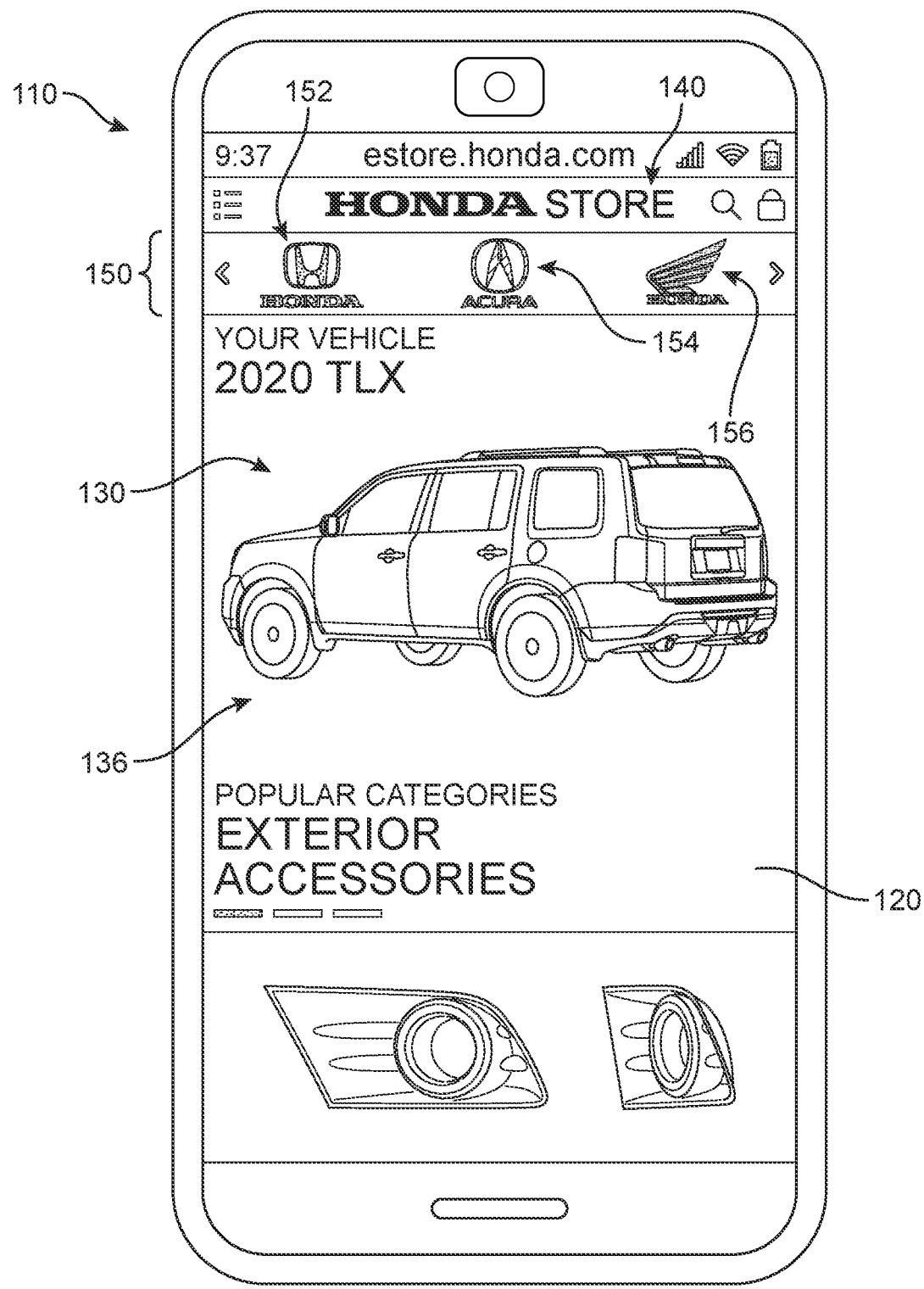

For purposes of introduction, an overview of one embodiment of the proposed systems and methods is illustrated with reference to FIGS. 1A-1C. In FIGS. 1A-1C, a first computing device ("first device") 110 in the form of a smartphone is shown. In other embodiments, first device 110 could be a tablet, laptop, desktop, or another type of computing device. The first device 110 includes a display 120 (in this case, a touchscreen display) that provides a viewing and interactive mechanism for the user. The display 120 presents a synergistic brands app ("app") 130 in which merchandise for each product division associated with a single company are described and/or offered for purchase.

For purposes of illustration, the reader may consider an example of a real-world business such as Honda®. The Honda Motor Company® is a multinational conglomerate corporation primarily known as a manufacturer of automobiles, motorcycles, aircraft, and power equipment provided through the several internal divisions and corporations, such as the American Honda Motor Company®, Honda Auto®, Honda Racing Corporation®, HondaJet®, Acura®, and other such divisions. In some embodiments, the proposed systems can integrate the various Honda branches on a unified website that streamlines the user experience, allowing for quick access to the broad range of Honda products available to customers. An example of this type of system is presented with reference to FIGS. 1A-1C. In this example, the company name is listed toward the top of the app 130 as a primary header 140 ("HONDA store"). In this case, a plurality of brands exists under the purview of the HONDA store, which is a large motor company.

Directly below and adjacent to the primary header 140 is a banner menu 150. The banner menu 150 includes a plurality of header elements comprising selectable tab options represented by specific icons that are each related to a particular brand. For example, the banner menu 150 in this case includes a first tab 152 (for a first product group "Honda"), a second tab 154 (for a second product group "Acura") and a third tab 156 (for a third product group "Honda" Powersports). Each tab can be distinguished from other tabs by the brand label or name (e.g., Honda, Acura) as well as the particular design of the label's logo or other symbol related to that brand. For purposes of illustration, the first product group Honda refers to an economy automobile division of the larger automotive company HONDA. Similarly, the second product group Acura refers to a high-end luxury automobile division of HONDA. Finally, the third product group Honda refers to a powersports division and for example can offer items such as motorcycles, ATVs, scooters, etc. In other embodiments, the divisions can encompass and support any other brand or product group for the given conglomerate or company.

In different embodiments, the app 130 will respond to a selection of one of the three tabs by switching the presentation mode between one product group landing page or channel to a different product group landing page. For example, in FIG. 1A, a user has selected the third tab 156, and in response the app 130 presents a first product group channel ("first channel") 132 corresponding to information and merchandise associated with the Honda Powersports product group. In FIG. 1B, the user has selected the first tab 152, and in response the app 130 switches to a second product group channel ("second channel") 134 corresponding to information and merchandise associated with the Honda vehicles product group. In FIG. 1C, the user has selected the second tab 154, and in response the app 130 switches to a second product group channel ("third channel") 136 corresponding to information and merchandise associated with the Acura product group. However, during each of these transitions, the primary header and associated options remain available. In other words, while the main website options remain consistent, the content for each brand is segmented under its own tab and can be configured to retain its own individual 'personality' and design, thereby promoting brand differentiation while under a unified umbrella.

As noted above, the app can also include provisions for supporting cross-brand synergy. In this case, the app is configured to subtly encourage a user to take note of each product group channel, and keep track of which channels have been viewed or visited. In the example of FIGS. 1A-1C, this process is implemented via a change in appearance of each of the tab icons. In FIG. 1A, where the third tab 156 was selected, the icon for the third tab 156 is 'lit up' or highlighted, while the unselected first tab 152 and the second tab 154 remain in a dormant state. For example, the icon for third tab 156 can be displayed in color, in particular in a color attached to the selected brand Honda Powersports, or otherwise have an appearance with greater contrast relative to the other as yet unselected tabs, which remain 'greyed out' or otherwise neutral, colorless and/or dimmer in appearance. For purposes of this application, greyed-out refers to an appearance or minimal contrast level that is greyscale or achromatic (i.e., zero color saturation, or a desaturated color). Contrast levels that are greater than the minimal (neutral) contrast level will typically include color saturation, or be chromatic.

As a general matter, the term contrast refers to the difference in luminance or color that makes an object (or its representation in an image or display) distinguishable against its background. In visual perception, contrast can be determined by the difference in the color and brightness of the object and other objects (e.g., nearby header elements) within the same field of view (e.g., the banner menu). In other words, a contrast level of a selectable icon allows the icon to appear more distinct against the background of the banner menu. In addition, the selected banner icons may include varying degrees of typographical emphasis, such as a minimal typographical emphasis in which the icon has a regular or roman type face (non-bolded, unitalicized, and no underline), and to increasing degrees of typographical emphasis in which boldface, italic, and/or underline type faces are applied, and/or changed font and size, capitalization, and increased letter spacing that may be used to indicate products landing pages that have been viewed by the user.

In different embodiments, this type of stylistic change can indicate to a user whether the user has visited a channel during the current user session. This can be more clearly observed in FIGS. 1B and 1C. In FIG. 1B, the user has selected the first tab 152. In response, the app 130 changes the appearance of the icon for the first tab 152 from a dormant, inactive, or otherwise 'not yet viewed' state or aspect to an accessed, awakened, activated, engaged, or viewed state or aspect. Furthermore, even while the user currently views the landing page for Honda vehicles in FIG. 1B, the icon of third tab 156 continues to appear in the active state, along with the icon of first tab 152. In contrast, second tab 154, which has not yet been selected, remains in the dormant state and has a more subtle or understated appearance relative to its counterparts that have been selected. As a non-limiting example, the icon for first tab 152 may have initially been presented in gray, but is now (post-selection) being presented in green, and the icon for the third tab 156 may initially have been presented in gray, and is now—having been selected by the user—being presented in red, while the icon for the second tab remains gray, or colorless. It can be appreciated that the color choices for each of the icons can correspond to the color traditionally linked to the specific brand represented by that icon, and can include any other hue. Thus, as an example, the Acura icon may be blue because the Acura product line is associated with a primarily blue-based marketing design for its brand.

Finally, in FIG. 1C, the user has selected the remaining second tab 154. In response, the app 130 changes the appearance of the icon for the second tab 154 from a dormant, inactive, or otherwise 'not yet viewed' state to an accessed, activated, engaged, or viewed state. Furthermore, even while the user currently views the landing page for Acura in FIG. 1C, the icons for both the third tab 156 and the first tab 152 continue to be displayed in the active state, and continues to appear highlighted, along with the icon of first tab 152. In other words, after being selected, each of the three tabs have transitioned to a more colorful, elaborate, striking, and/or prominent appearance relative to their appearance prior to the user's selections. The change in appearance can be understood to indicate to the user that the landing page for that particular brand has been visited by the user, while the low contrast, duller appearance that was displayed previously for each product group reminds the user that they have not yet visited the landing page for that product group, and gently nudges or guides the user toward content that may yet be of interest to them.

Thus, in different embodiments, the selectable icons are initially greyed out (shown in greyscale or with an achromatic appearance). However, once an icon is selected by the user to trigger the display of a landing page for a particular product group, the icon appearance is displayed in a particular color. For example, upon the initial access of the Honda website, greyed-out icons for Honda Auto, Acura, and Honda Motorcycle would be presented on the banner. When a particular product group is selected, the corresponding product group icon is shown in the brand's standard color, such as light blue for Honda Auto, black for Acura, and red for Honda Motorcycle. The icons in the banner menu that have been selected will remain in color even after the user navigates to other product group pages.

Figure 2:
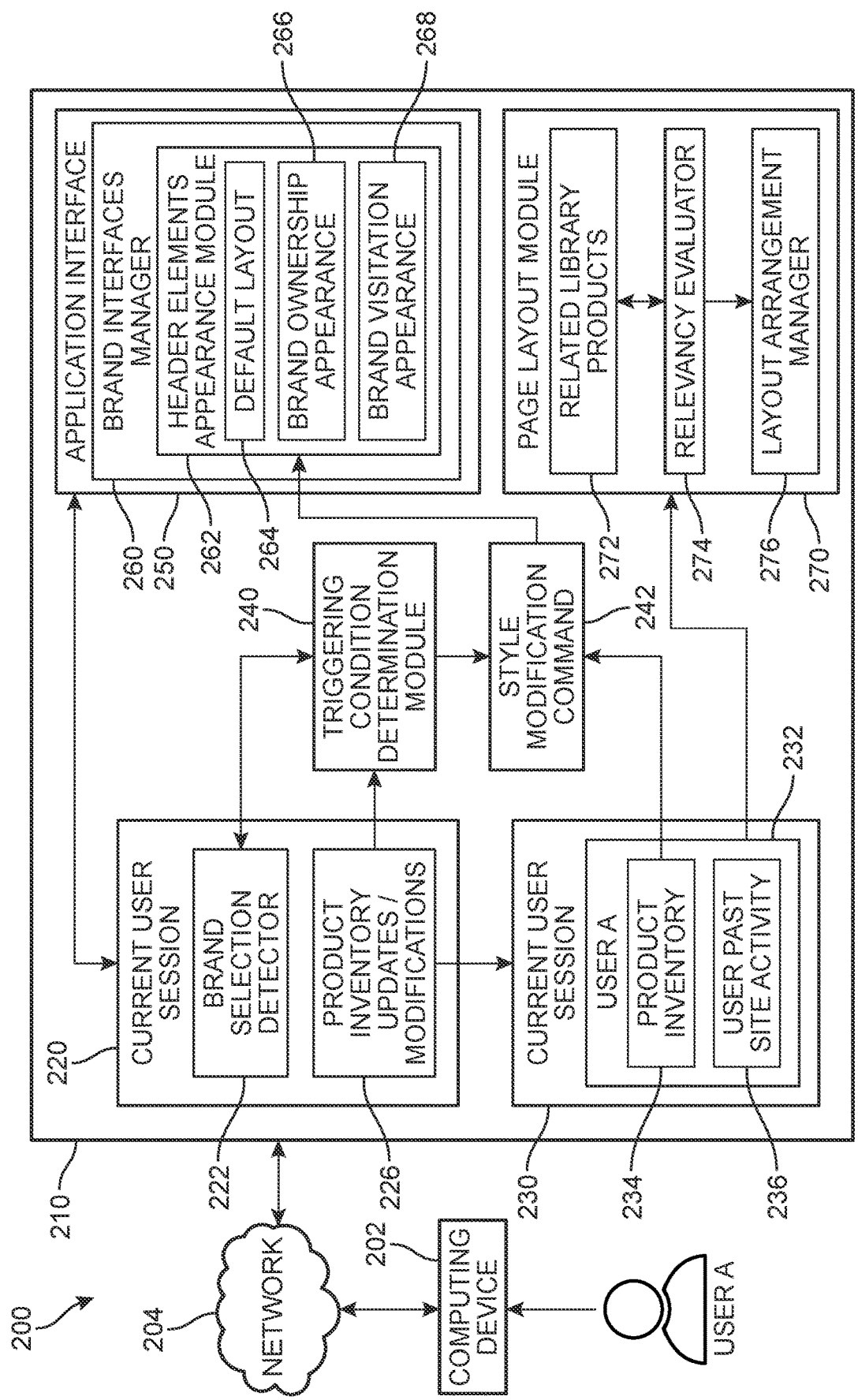
FIG. 2 is a schematic diagram of an application system configured to modify the appearance of header elements based on user behavior and/or user product ownership, according to an embodiment.

In order to provide the reader with a greater appreciation of the embodiments, FIG. 2 depicts a schematic overview of an embodiment of a responsive presentation application environment ("environment") 200. FIG. 2 is shown for the purposes of illustrating one or more exemplary embodiments and not for purposes of limiting the same. The components of the environment 200, including application system ("app" or "application") 210, as well as the components of other systems, hardware architectures, and software architectures discussed herein, may be combined, omitted, or organized into different architectures for various embodiments.

In FIG. 2, the environment 200 includes a computing device 202 that communicates over a network 204 to application 210. For purposes of illustration, a user (identified here simply as "User A") accesses the front-end user interface of the application provided by the application 210 via computing device 202. The computing device 202 may include provisions for communicating with the application 210. In some embodiments, the communication may occur over network 204. Generally, network 204 may be any type of network, including, but not limited to Wi-Fi networks, cell phone networks, as well as any other type of network. Furthermore, network 204 may be associated with any type of network standard including, but not limited to CDMA, TDMA, GSM, AMPS, PCS, analog and/or W-CDMA.

In some embodiments, the application 210 may be hosted on a cloud-based server that may include a plurality of interconnected servers (not shown), including but not limited to web servers, data servers, database servers, domain controllers, backup servers, and the like. The application 210 may further include a plurality of modules that provide a plurality of functions. In different embodiments, the application 210 includes an application interface module 250 which is configured to present graphical elements for the application 210. The application interface module 250 further includes a brand interfaces manager 260, which is configured to present and adjust the appearance of brand-specific webpages that will be available via the primary interface for the larger company. For example, a header elements appearance module 262 is configured to manage the appearance of header elements of each brand-specific page, including but not limited to the arrangement, design, color, and typographical emphasis of each of the brand icons (such as discussed in FIGS. 1A-1C).

When a user accesses the application, he or she can initiate a current user session 220. In one embodiment, if a user has not used the app previously, a profile and account creation user interface may be made available to the user. The account creation user interface may provide capability for the user to create a user account with a user ID and a password or other similar login credentials. The single account can then be used to access the full range of product groups integrated within the app. A user accounts database ("database") 230 may store the user profile for each user. For example, the database 230 includes a User A profile 232, which among other data items, can include information about company products that have been purchased or are otherwise owned by User A as a product inventory 234. In addition, in some embodiments, the database may include a record of User A's past activity 236 during their use of the app, in order to personalize the presentation of information and products on subsequent app access sessions. If the user makes purchases through the app, the later purchases can also be automatically added to the product inventory 234.

Once the user has logged into their account, they may interact with various selectable graphical elements of the interface, including the header elements. When the user first begins the current user session 220, the app will generate and display the interface elements based on a default layout 264. In one embodiment, under the default layout 264, the header elements appear neutral or greyed out (i.e., in greyscale), as discussed above, and will be discussed in further detail below (see FIGS. 3A-3E). In other embodiments in which product ownership will affect the appearance of header elements, the default layout 264 can operate in conjunction with a brand ownership appearance module 266, thereby providing an indication to a user as to whether a particular product group includes a product that is already owned by the user (see FIGS. 4-5B).

However, as noted earlier, in different embodiments, the header elements are configured to change in response to specific user behavior events. As shown in FIG. 2, during the current user session 220, the application 210 is configured to detect whether particular user interactions occur, for example via a brand selection detector 222. Similarly, in some cases, the user's product inventory may change during the current user session 220, resulting in updates 226 being made to the product inventory 234. In different embodiments, either of these events may be identified as a triggering event that would lead to a change in the appearance of one or more header elements. If a triggering condition determination module 240 of application 210 determines, based on inputs received from the brand selection detector 222 or product inventory updates 226, that the user behavior or activity corresponds to a particular condition, it may trigger generation of one or more style modification commands 240 that is then transmitted to the brand interfaces manager 260. If the triggering event is based on a user selection of the one of the brand header elements, the brand visitation appearance module 268 will alter the presentation of the designated header element (e.g., a brand icon) in response to the style modification command. In cases where the triggering event is based on a change in the user's product inventory (see FIGS. 5A and 5B), the brand ownership appearance module 266 will alter the designated header element (e.g., a brand icon) in response to the style modification command. In other words, one or both of the brand ownership appearance module 266 and brand visitation appearance module 268 are configured to make changes to the default appearance of header elements in response to triggering events based on user selections during the current user session and/or the user's current product inventory 234.

Furthermore, in some embodiments, the page layout for each brand may be personalized based on one or both of the user's product inventory 234 and the user's past site activity 236. For example, a page layout module 270 may, based on inputs received from either or both of the product inventory 234 and user past site activity 236, alter the layout of one or more product data objects being displayed on a page, including but not limited to changes to the typography, color, grid, iconography, images, motion, tone, etc. of objects on the page. A layout arrangement manager 276 can customize the presentation of objects based on the results provided by a relevancy evaluator 274. The relevancy evaluator 274 is configured to assess the user's current product inventory 234 and, with reference to a preconfigured related products library 272, determine which products are related to the user's owned products, and which products might thereby be recommended to said user. This information will be used by the layout arrangement manager 276 to organize the page presentation to encourage, guide, or bring attention to specific products that are known to be of use to and/or popular with the owned products.

In some embodiments, the layout can be modified so that products are displayed in order of their degree of relevance to the owned product. Thus, products that are identified as being more relevant to the user's owned product will be displayed first, or above, while products that are less relevant will be displayed further below. In addition, in one embodiment, aspects of the layout can be altered to provide an indication to a user whether an identified product (e.g., in a listing of products) is already owned by the user. Furthermore, in some embodiments, the layout arrangement manager 276 may determine the location, placement, orientation, size, or the like, of each graphical element to be displayed. In some embodiments, the application can be configured to provide a uniform arrangement and appearance for product advertising throughout all product group pages in the single application, such that a user navigating from one page to another will find objects arranged in a consistent, familiar manner.

As discussed herein, embodiments of the application system 210 may be configured to allow a company or other group to customize the design scheme of its chosen template. In some embodiments, the app is a stand-alone application to be accessed through a computing device such as a laptop or smartphone. In other embodiments, this application is a web-based application which may be accessed through any network connection. Companies may be able to customize the fonts used in the user interface. In some embodiments, companies may choose from a selection of chosen font pairs which go well together. Color schemes, font size and choice and animations may be customized to align with the company's particular brand designs. In some cases, companies may wish to use a more subtle method of branding; for example, using only the logo or icon of the product group without the brand name attached. Thus, the appearance of the application, and in particular the header elements, can easily be changed to a company or end user's preference. Additional brands (and landing pages) for the company can also be readily integrated into the app. This flexibility provides many opportunities for marketing and promotion of its multiple brands. The appearance of some of the elements on a page can then be adjusted in response to the determination that one or more triggering events have occurred during a current user session.

For purposes of illustration, another example of the proposed systems is provided with reference to the sequence of FIGS. 3A-3E. In FIGS. 3A-3E, a second computing device ("second device") 300 in the form of a tablet is shown. In other embodiments, second device 300 could be a smartphone, laptop, desktop, or another type of computing device. The second device 300 includes a display 302 (in this case, a touchscreen display) that provides a viewing and interactive mechanism for the user. The display 302 presents an embodiment of a synergistic brands app ("app") 304 in which merchandise for each product division associated with a single company are described and/or offered for purchase.

In this example, a generic company name is listed toward the top of the app 304 as a primary header 310 ("UMBRELLA Company"). In this case, a plurality of brands exists under the purview of the Umbrella Company, which for purposes of this example is a travel and hospitality conglomerate. Furthermore, directly below and adjacent to the primary header 310 is a banner menu 320. The banner menu 320 includes a plurality of header elements comprising selectable tab options represented by specific icons that are each related to a particular brand. For example, the banner menu 320 in this case includes a first selectable icon 330 (for a first product group "Brand A"), a second selectable icon 332 (for a second product group "Brand B"), a third selectable icon 334 (for a third product group "Brand C"), a fourth selectable icon 336 (for a fourth product group "Brand D"), a fifth selectable icon 338 (for a fifth product group "Brand E"), and a sixth selectable icon 340 (for a sixth product group "Brand F"). Each icon can be distinguished from other icons by the brand label or name (e.g., Brand A, Brand B, etc.) as well as the particular design of the label's icon. In different embodiments, the divisions can encompass and support any other brand or product group for the given conglomerate or company.

Figure 3A:
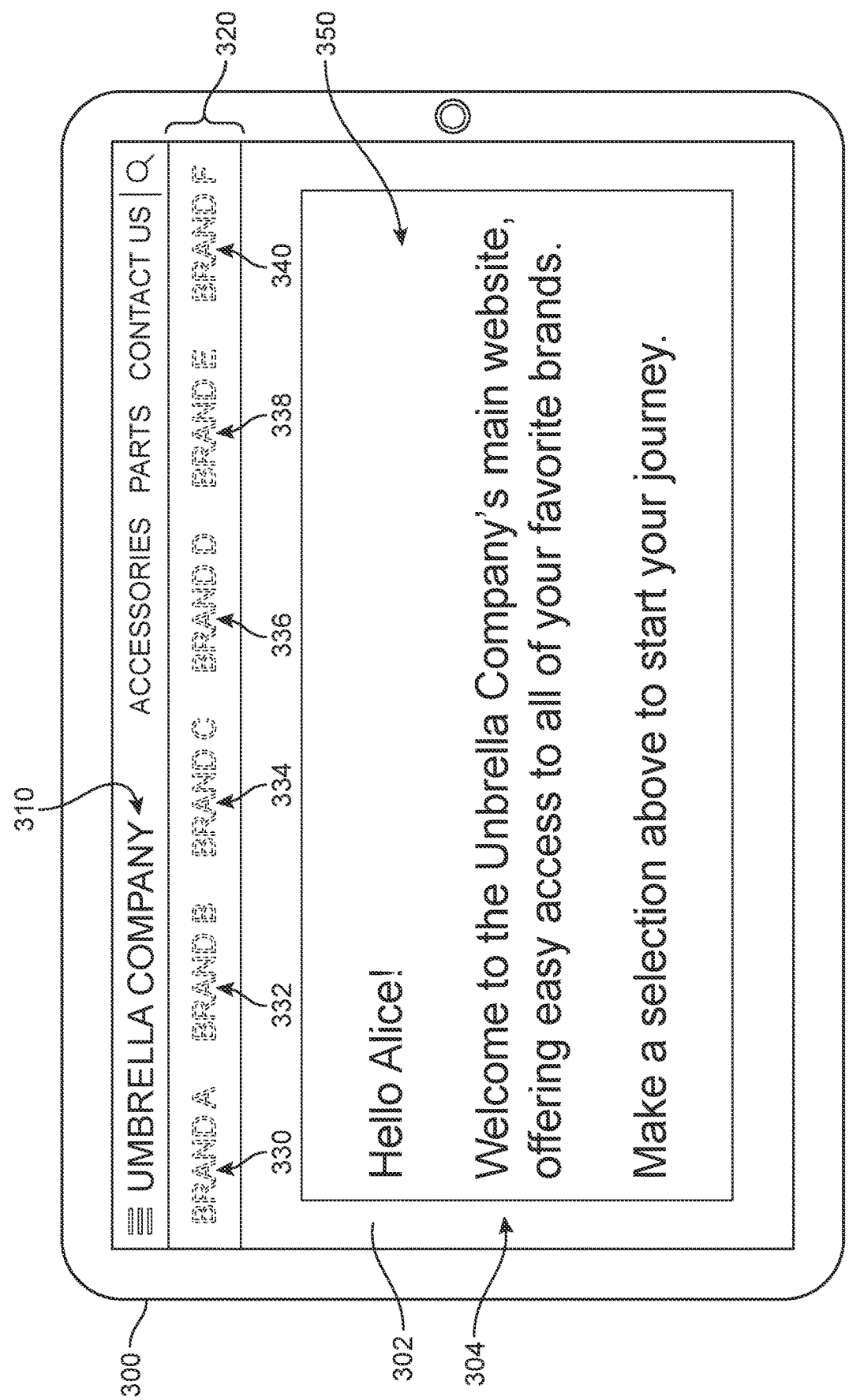
FIGS. 3A-3E present a sequence in which an application displays a series of selectable icons, and where the appearance of the selectable icons is responsive to user in-app behavior, according to an embodiment.
Figure 3B:
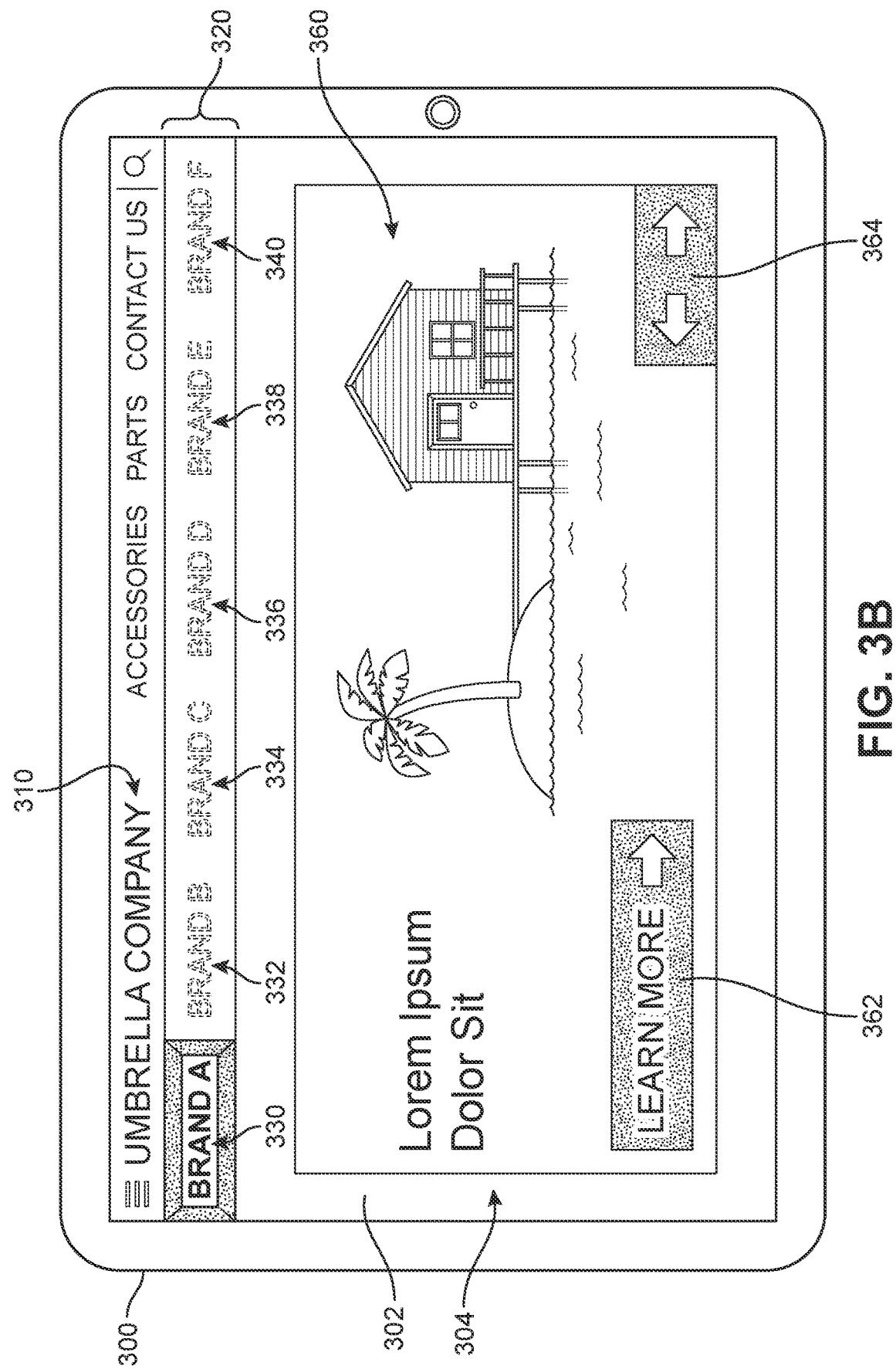

In FIG. 3A, a main landing page 350 is being presented following a user login. In this example, the main landing page 350 represents the initial welcome content ("Hello Alice! Welcome to the Umbrella Company's main website, offering easy access to all of your favorite brands. Make a selection above to start your journey."). In this initial stage, none of the icons in the banner menu are in color or otherwise distinguishable from one another. More specifically, all of the icons are greyed out, corresponding to the default layout for the application, where no user activity has yet caused a change in the appearance of any of the banner icons.

As noted above, in different embodiments, the app 304 is configured to respond to a selection of one of the displayed selectable icons by switching the presentation mode from the main landing page 350 to the product group landing page linked to the selected icon. For example, in FIG. 3B, a user has selected the first selectable icon 330, and in response the app 304 presents a first product group landing page ("first page") 360 corresponding to information and merchandise associated with the Brand A product group. In addition, the appearance of the first selectable icon 330 has changed (e.g., includes a color associated with its brand or is otherwise distinguishable from its previous appearance by a change in formatting and/or layout), in contrast to the other selectable icons, which remain greyed out. In other words, the greying-out of icons in the top banner is applied to all of the icons until they are selected, at which point the appearance of the icon changes to the associated brand color.

Furthermore, in some embodiments, the first page 360 will reaffirm the promotional messaging for Brand A by displaying other selectable options such as a first option 362 and a second option 364 in the same color and style as the current appearance of the first selectable icon 330. Other objects displayed on the first page 360 may also be colored or otherwise formatted to appear similar to the format used for the appearance of the first selectable icon 330 in the active state, establishing a uniform pattern that will increase the user's feeling of familiarity with the product group, as well as more clearly distinguish the first page 360 from the other product group pages. In other words, in some embodiments, each brand unit is supported by a particular color, and that color serves to differentiate the landing page of one brand from another. In addition, as the switch to another landing page occurs, the primary header and associated options remain available. Thus, while the main website options remain consistent, the content for each brand is segmented under its own tab and can be configured to retain its own individual 'personality' and design, thereby promoting brand differentiation while under a unified umbrella.

Figure 3C:
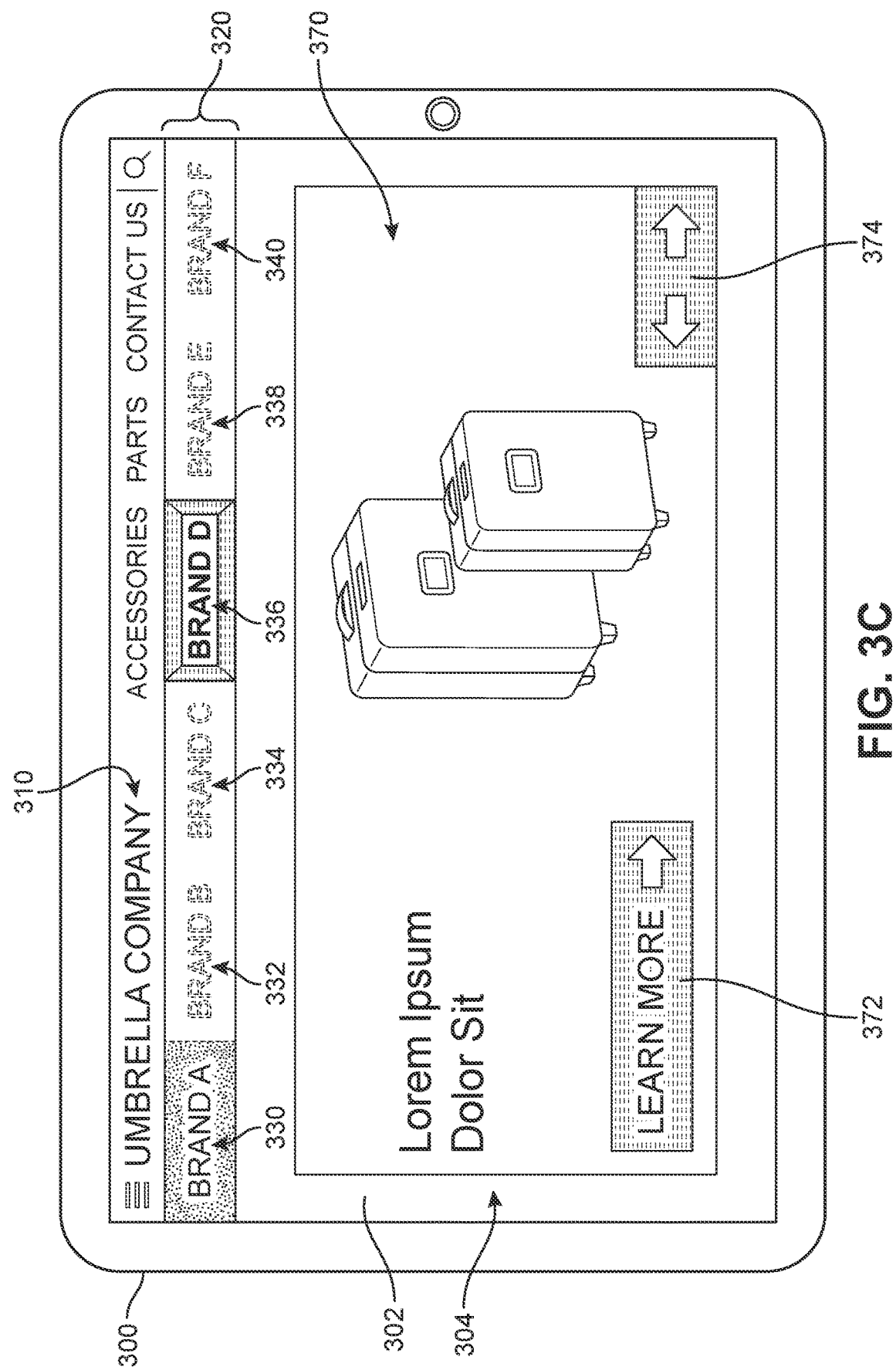

In FIG. 3C, the user has selected the fourth selectable icon 336. In response, the app 304 switches from the first page 360 of FIG. 3B to a second product group landing page ("second page") 370 corresponding to information and merchandise associated with the Brand D product group. In addition, the appearance of the fourth selectable icon 336 has changed (e.g., includes a color associated with its brand or is otherwise distinguishable from its previous appearance by a change in formatting and/or layout). This change is in contrast to the other selectable icons, which remain greyed out (i.e., signaling those pages have not yet been visited by the user), with the exception of the first selectable icon 330, which continues to appear as it did in FIG. 3B, indicating to the user that the first page has been viewed by said user. Furthermore, the second page 370 continues to affirm the promotional messaging for Brand D by displaying other selectable options such as a third option 372 and a fourth option 374 in the same color and style as the current appearance of the fourth selectable icon 336. Other objects displayed on the second page 370 may also be formatted to appear similar to the format used for the appearance of the fourth selectable icon 336 in the active state, establishing a uniform pattern that will increase the user's feeling of familiarity with the product group, as well as more clearly distinguish the second page 370 from the other product group pages.

Figure 3D:
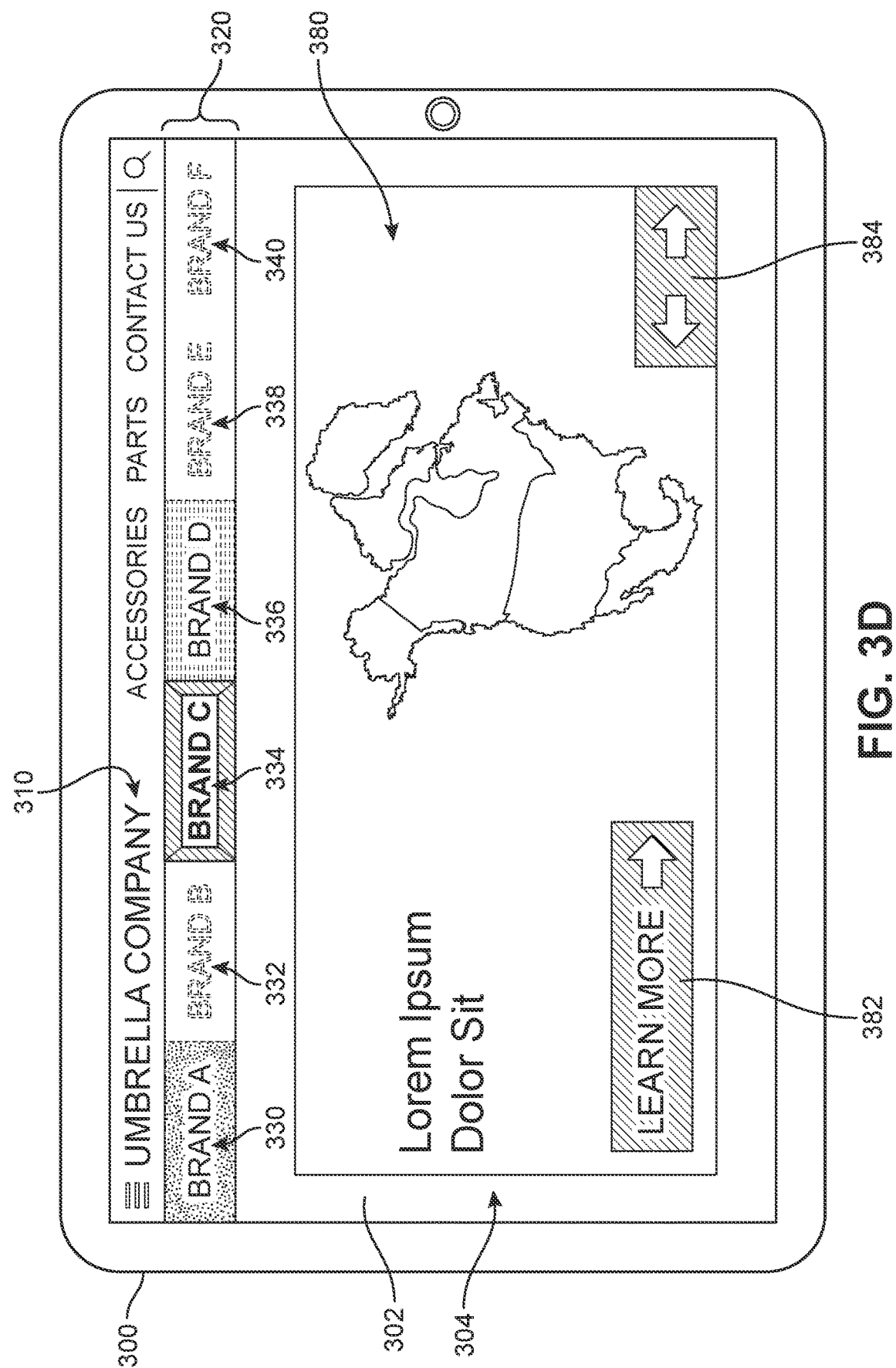

In FIG. 3D, the user has next selected the third selectable icon 334. In response, the app 304 switches the presentation from the second page 370 of FIG. 3C to a third product group landing page ("third page") 380 corresponding to information and merchandise associated with the Brand C product group. In addition, the appearance of the third selectable icon 334 has changed (e.g., includes a color associated with its brand or is otherwise distinguishable from its previous appearance by a change in formatting and/or layout). This change is in contrast to the other as yet unselected selectable icons, which remain greyed out (i.e., signaling those pages have not yet been visited by the user). Meanwhile, both the first selectable icon 330 and the fourth selectable icon 336 continue to appear in the active state, indicating to the user that those pages have been viewed by said user. Furthermore, the third page 380 continues to affirm the promotional messaging for Brand C by displaying other selectable options such as a fifth option 382 and a sixth option 384 in the same color and style as the current appearance of the third selectable icon 334. Other objects displayed on the third page 380 may also be formatted to appear similar to the format used for the appearance of the third selectable icon 334 in the active state, establishing a uniform pattern that will increase the user's feeling of familiarity with the product group, as well as more clearly distinguish the third page 380 from the other product group pages.

Figure 3E:
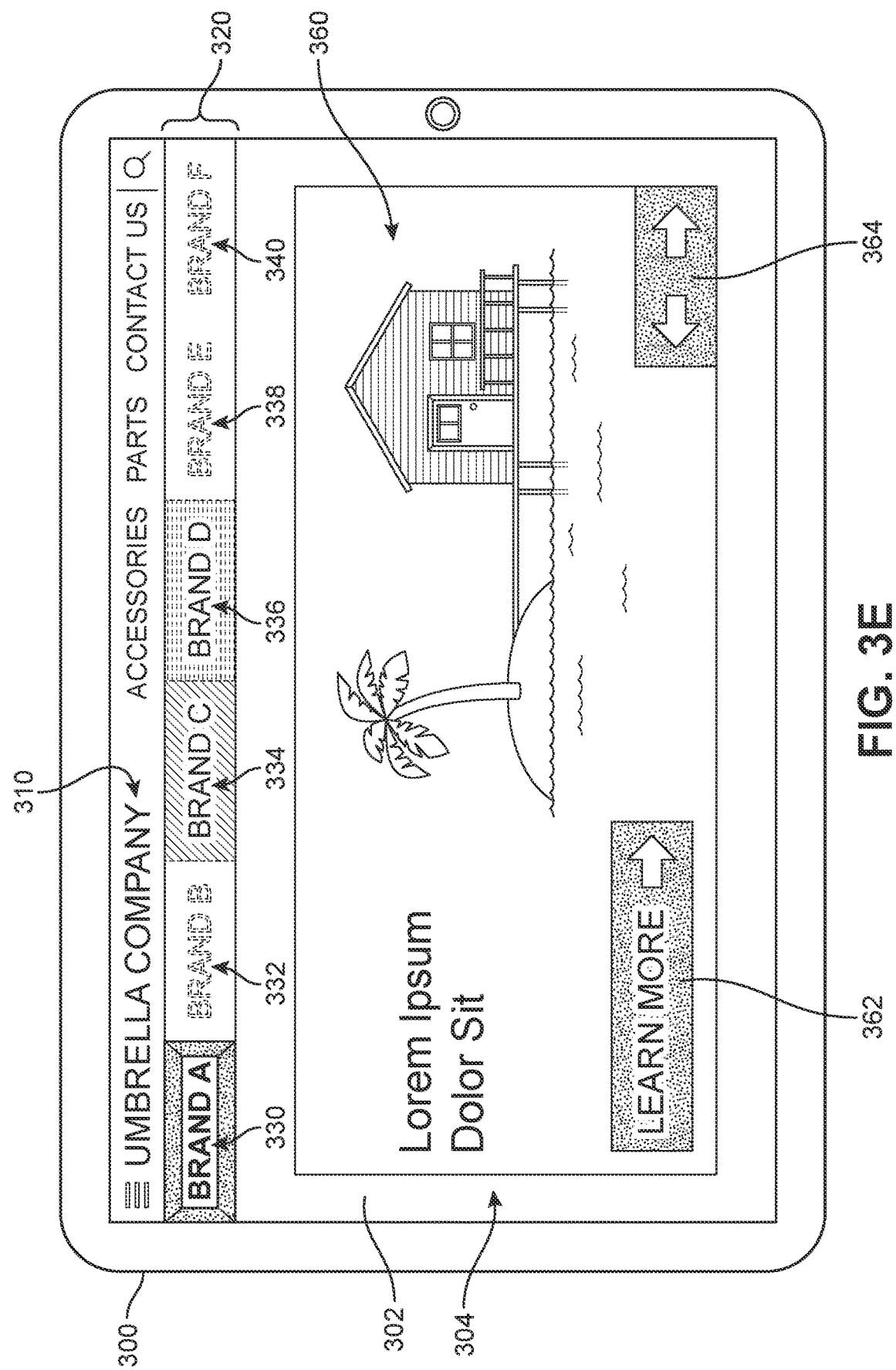

Finally, in FIG. 3E, the user has returned to the first page 360 by selection of the first selectable icon 330. It can be seen that while the user currently views the landing page for Brand A, the icons for the first selectable icon 330, the third selectable icon 334, and the fourth selectable icon 336 continue to be displayed in the active state. In other words, after being selected, each of the three icons have retained a more colorful, elaborate, striking, and/or prominent appearance. The change in appearance can be understood to indicate to the user that the landing page for that particular brand has been visited by the user, while the low contrast, duller appearance applied to Brand B, Brand E, and Brand F reminds the user that they have not yet visited the landing page for that product group, and gently nudges or guides the user toward content that may yet be of interest to them.

Figure 4:
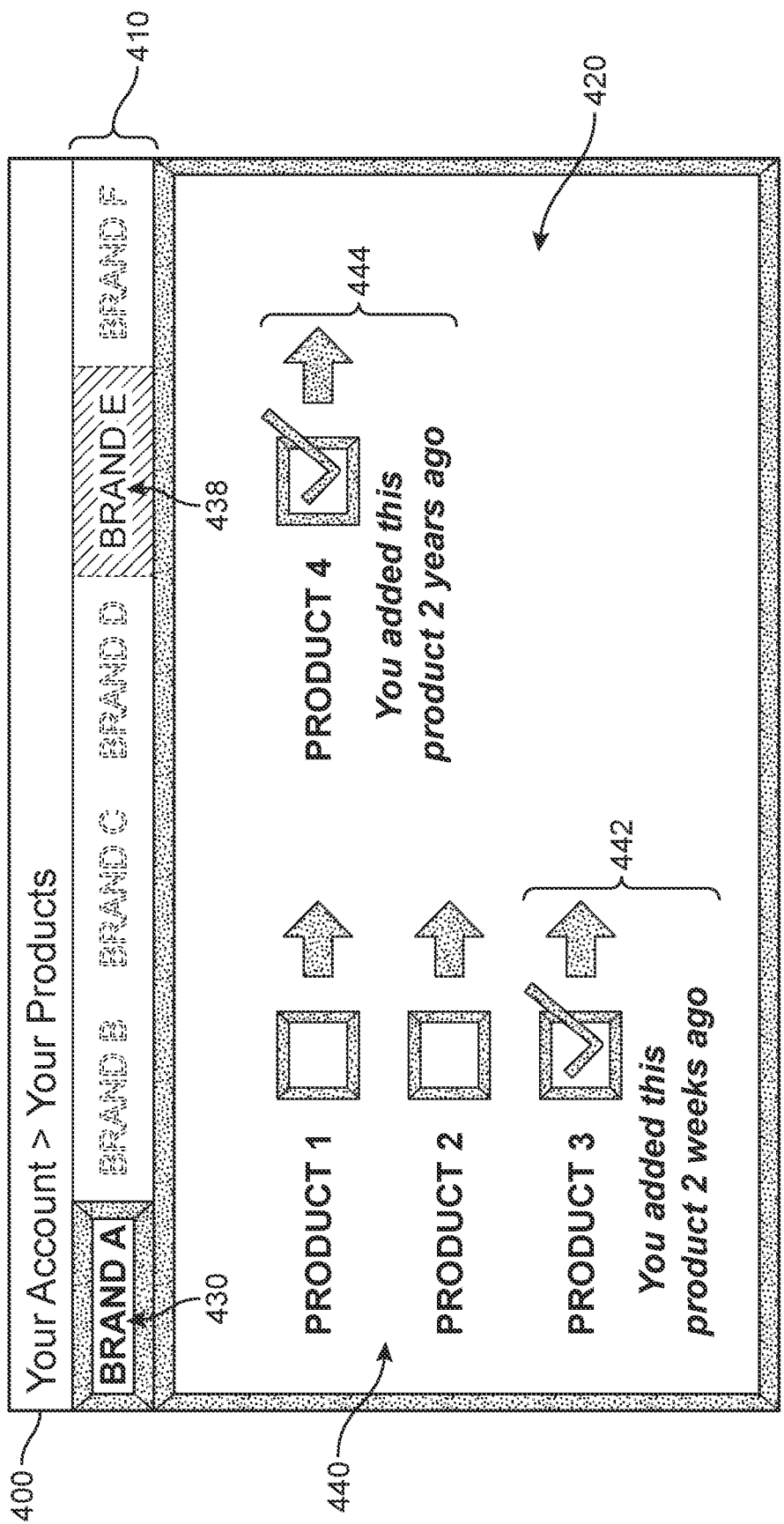
FIG. 4 is a schematic diagram of a user interface for modifying a user's product inventory, according to an embodiment.

As noted above, in different embodiments, the app 304 can include provisions for modifying a user's inventory of owned products. Simply for purposes of example, FIG. 4 depicts an inventory interface 400 configured to allow a user to update or otherwise change the record of products owned by said user. In one embodiment, as shown in FIG. 4, the inventory interface 400 can be segmented by the product group divisions. As shown in FIG. 4, the inventory interface 400 includes a plurality of selectable tabs 410 for navigating to an inventory listing for a particular product group. In this example, a first tab 430 ("Brand A") has been selected, and a first product listing 420 is displayed. The first product listing 420 includes a plurality of product names 440. In some embodiments, each product listed can include a mechanism by which the user may indicate whether he or she owns said product (e.g., a clickable box). The current inventory shown in FIG. 4 includes a first product 442 ("Product 3") and a second product 444 ("Product 4"). In some optional embodiments, additional details may also be shown or available regarding the product, specifications, warranties, FAQs, and/or its purchase history by the user. In different embodiments, the plurality of selectable tabs 410 can include tabs that differ in appearance if the user owns products within that division. As the inventory changes to include other products under other brands, the appearance of those tabs will also change. This is represented by the box surrounding both first tab 430 as well as a second tab 438 ("Brand E").

Figure 5A:
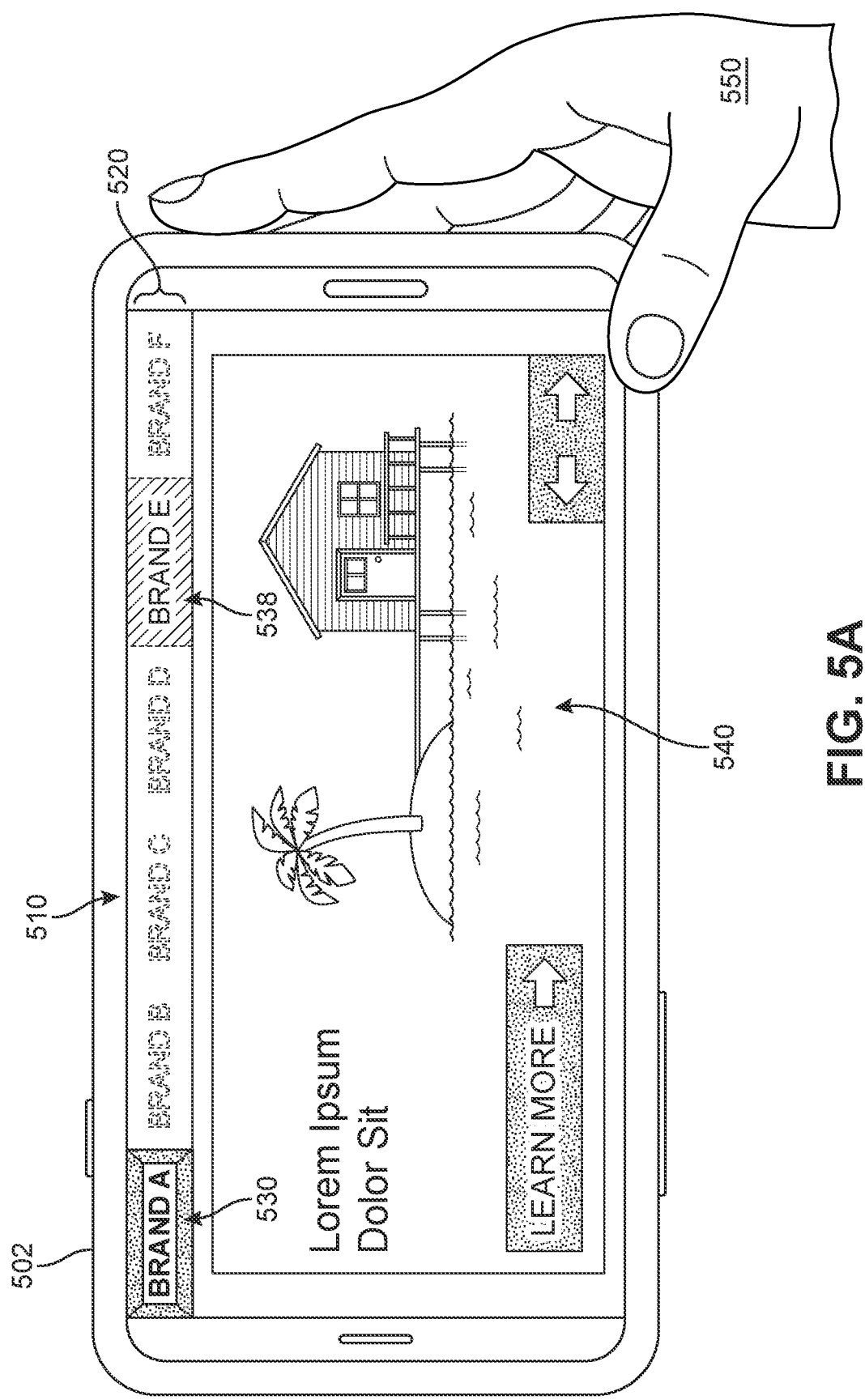
FIGS. 5A and 5B are examples of an applications in which the appearance of some selectable icons can be adjusted depending on the products owned by the user.

In different embodiments, the application can include provisions for providing visual cues or signals that can remind a customer about their own current product inventory. In some embodiments, the selected banner icons may include varying degrees of typographical emphasis, such as a minimal typographical emphasis in which the icon has a regular type face (non-bolded, unitalicized, and no underline), and to increasing degrees of typographical emphasis in which bold, italic, and/or underline type faces are applied, and/or changed font and size, capitalization, and increased letter spacing that may be used to indicate whether the user owns products within a particular product group. For example, the icon representing a product group in which the customer owns a product may be displayed in bold and in color (rather than being greyed out) prior to the icon selection if a product is owned by the customer. Two non-limiting examples are shown with reference to FIGS. 5A and 5B. For the customer whose account was presented in FIG. 4, the system determines products are owned by the current user in both Brand A and Brand E. In some embodiments, the banner appearance can be adjusted, in response to this determination, to reflect the brands owned by the user. A first example is shown in FIG. 5A, where app 540 a highlighted background has been added to the two product group icons on a banner menu 520 for which a user 550 owns products. Thus, both a first selectable icon 530 (Brand A) and a fifth selectable icon 538 (Brand E) include a colorful background, while the remaining brand icons on the banner menu remain greyed out and relatively less conspicuous. Such a contrast can serve to promote the neutral product groups, and/or guide the user 550 toward perusing the brand pages for other products that they may have an interest in. For example, the greyed-out icons can draw a user in by signaling that the user has not yet purchased products in that group and may encourage or motivate them to explore these other brands.

If the user 550 then terminates ownership of a particular product, they may update or modify their inventory (see FIG. 4). For example, user 550 may remove a record of ownership of products in Brand A, obtain or purchase products under Brand C, and retain products in Brand E. As a result, in FIG. 5B, when the user 550 access the app 540, the banner menu 520 is adjusted to such that the first selectable icon 530 appears in low contrast similar to the other greyed out icons, while a third selectable icon 534 has been made conspicuous, along with the fifth selectable icon 538. Simply for purposes of illustration, in this case, the two icons are stylized with a font that is bold and underlined (rather than highlighted). In some embodiments, the contrast can be increased corresponding to the number of products owned by the user in that brand. In other words, if the user owns five products under a first brand and fourteen products under a second brand, the highlighting may be brighter or more prominent for the second brand than for the first brand. As another example, the first brand and the second brand may be in bold, but the bold applied to the second brand may be thicker or otherwise more conspicuous.

Furthermore, in some embodiments, the brand color can also be applied to the icons for product groups in which the user 550 owns products. In different embodiments, once an owned product's group icon (e.g., fifth selectable icon 538) is selected by the user 550 for viewing, the typographical emphasis will be removed while the standard color associated with that brand is retained. In another example, the icon may simply be displayed in bold (or some other typographical emphasis) while remaining colorless prior to the icon selection if a product is owned by the customer. In one embodiment, once an owned product's group icon is selected by the customer for viewing, the typographical emphasis is maintained while the standard color is also added. In another embodiment, once the owned product's group icon is selected by the customer for viewing, the typographical emphasis is removed while the standard color is added. In yet another embodiment, once the owned product's group icon is selected by the customer for viewing, the typographical emphasis is reduced or diminished (i.e., there is still a contrast but it is less than it had been prior to the user selection of that icon). For example, the bolding associated with an icon for a brand in which the user owns a product may be at a first level prior to user selection, and at a second level following selection, where the second level is of less intensity than the first level, allowing the user to track their progress through the app.

Figure 5B:
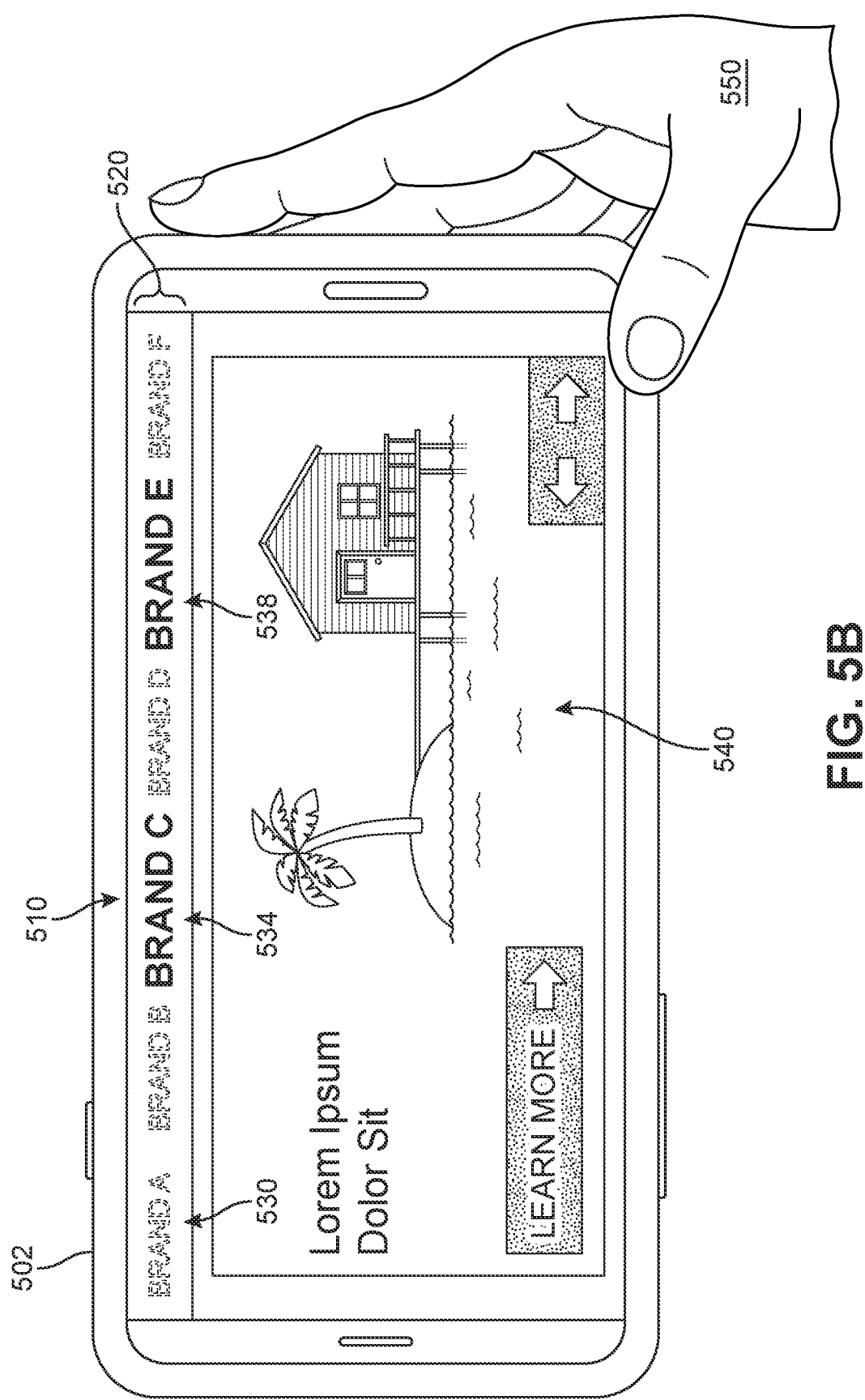

It should be understood that different embodiments can include some or all of the properties and functions discussed with respect to FIGS. 1A-1C and FIGS. 3A-3E as well as that of FIGS. 4-5B. For example, when a user logs into the app, the icons for brands which are owned by the user may include some type of typographical emphasis, while remaining colorless (e.g., grey). Once an icon is selected by the user, that icon will 'light up' with color and remain in color for the remainder of the user session.

Figure 6:
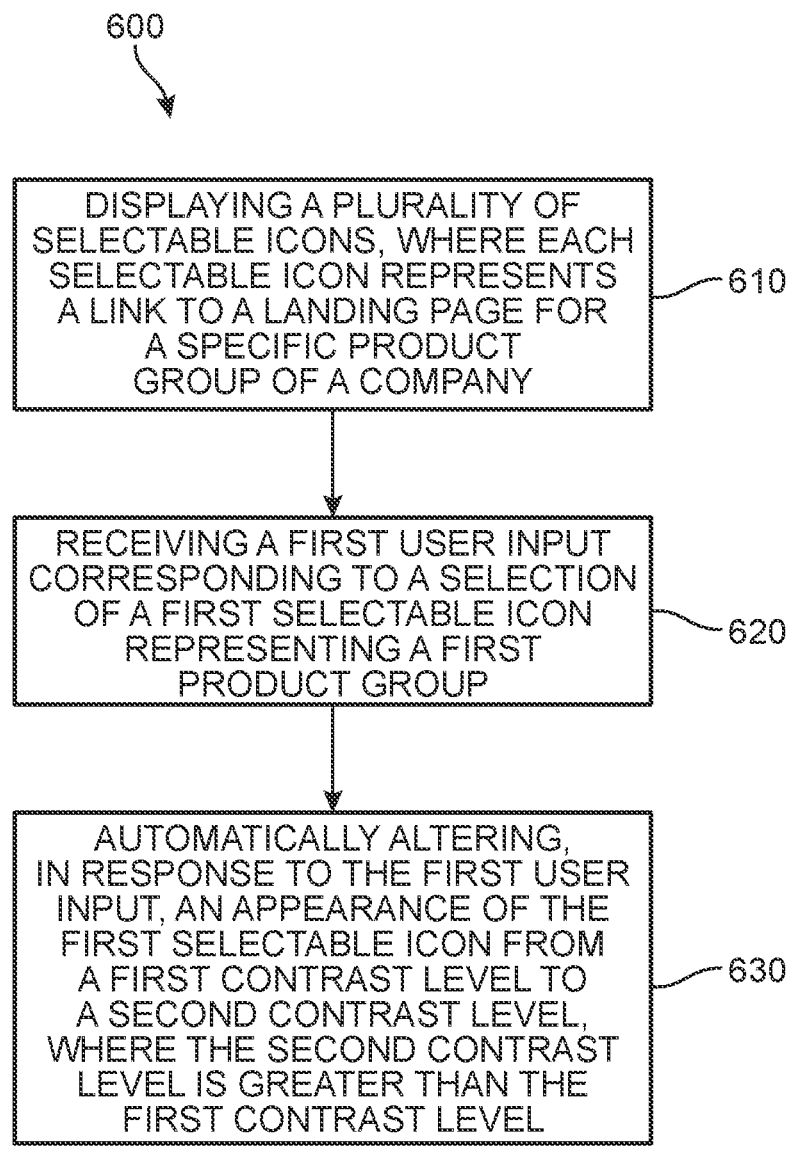
FIG. 6 is a flow diagram of a process for modifying an appearance of graphical elements of an application in response to in-app user behavior, according to an embodiment.

FIG. 6 is a flow chart illustrating an embodiment of a method 600 for modifying an appearance of graphical elements of an application in response to user behavior. The method 600 includes a first step 610 of displaying a plurality of selectable icons, where each selectable icon representing a link to a landing page for a specific product group of a company, and the plurality of selectable icons include at least a first selectable icon. The method 600 also includes a second step 620 of receiving, via the application, a first user input corresponding to a selection of the first selectable icon representing a first product group. Furthermore, the method includes a third step 630 of automatically altering, in response to the first user input, an appearance of the first selectable icon from a first contrast level to a second contrast level, the second contrast level being greater than the first contrast level.

In other embodiments, the method may include additional steps or aspects. As one example, the first contrast level may be achromatic, and the second contrast level may be chromatic. In one embodiment, the method also includes steps of receiving, via the application, a second user input corresponding to a selection of a second selectable icon representing a second product group, and automatically altering, in response to the second user input, an appearance of the second selectable icon from a third contrast level to a fourth contrast level, the fourth contrast level being greater than the third contrast level. In such cases, the method may also include a step of maintaining the appearance of the first selectable icon at the second contrast level after receiving the second user input. In one example, the second contrast level and the fourth contrast level are substantially similar. In another example, the first contrast level and the third contrast level are substantially similar.

In some other embodiments, the plurality of selectable icons further includes a second selectable icon representing a second product group, and an appearance of the second selectable icon is maintained at a third contrast level prior to and subsequent to receiving the first user input, the third contrast level being less than the second contrast level. In such cases, the third contrast level can be substantially similar to the first contrast level. In another example, the plurality of selectable icons further includes a second selectable icon representing a second product group for the company. In such cases, the method may further include steps of automatically accessing an inventory profile for a first user account and determining that the inventory profile includes a first product associated with the second product group, and automatically adjusting, in response to determining the inventory profile includes the first product, an appearance of the second selectable icon such that the second selectable icon has a greater typographical emphasis than the first selectable icon.

Other methods may be contemplated within the scope of the present disclosure. For example, in some embodiments, a method for adjusting an appearance of graphical elements of an application in response to a user inventory profile can include a first step of receiving, via the application, a first user login for a first user account, and a second step of initiating a first access session in response to the first user login, the first access session linked to the first user account. In addition, the method can include a third step of automatically accessing an inventory profile for the first user account and determining that the inventory profile includes a first product associated with a first product group of the company. Furthermore, the method can include a fourth step of displaying a plurality of selectable icons, each selectable icon representing a link to a landing page for a specific product group of a company, where the plurality of selectable icons includes a first selectable icon corresponding to the first product group and a second selectable icon corresponding to a second product group. The method may also include a fifth step of automatically adjusting, in response to determining the inventory profile includes the first product, an appearance of the second selectable icon such that the second selectable icon has a greater typographical emphasis than the first selectable icon.

In other embodiments, this method may include additional steps or aspects. As one example, in cases where the inventory profile includes a second product and a third product associated with a third product group of the company, the plurality of selectable icons can also include a third selectable icon corresponding to the third product group. In such cases the method may also include a step of adjusting an appearance of the third selectable icon such that the third selectable icon has a greater typographical emphasis than the second selectable icon.

In another example, the method can also include steps of receiving, via the application, a first user input corresponding to a removal of the first product from the inventory profile, and automatically altering, in response to the first user input, an appearance of the second selectable icon such that the second selectable icon and the first selectable icon have a substantially similar typographical emphasis. In some embodiments, the second selectable icon has a bold type face and the first selectable icon has a regular type face. In some other examples, the method can further include steps of receiving, via the application, a first user input corresponding to a selection of the first selectable icon representing a first product group, and automatically altering, in response to the first user input, an appearance of the first selectable icon from a first contrast level to a second contrast level, the second contrast level being greater than the first contrast level.

The following includes definitions of selected terms employed herein. The definitions include various examples and/or forms of components that fall within the scope of a term and that can be used for implementation. The examples are not intended to be limiting. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system includes one or more processors. A "processor", as used herein, generally processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

The apparatus and methods described herein and illustrated in the accompanying drawings by various blocks, modules, components, circuits, steps, processes, algorithms, etc. (collectively referred to as "elements") can be implemented using electronic hardware, computer software, or any combination thereof. Whether such elements are implemented as hardware or software depends upon the particular application and design constraints imposed on the overall system. By way of example, an element, or any portion of an element, or any combination of elements can be implemented with a "processing system" that includes one or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The processor can be connected to a communication infrastructure (e.g., a communications bus, cross-over bar, or network). Various software aspects are described in terms of this example computer system. After reading this description, it will become apparent to a person skilled in the relevant art(s) how to implement aspects described herein using other computer systems and/or architectures.

Computer system can include a display interface that forwards graphics, text, and other data from the communication infrastructure (or from a frame buffer) for display on a display unit. Display unit can include display, in one example. Computer system also includes a main memory, e.g., random access memory (RAM), and can also include a secondary memory. The secondary memory can include, e.g., a hard disk drive and/or a removable storage drive, representing a floppy disk drive, a magnetic tape drive, an optical disk drive, etc. The removable storage drive reads from and/or writes to a removable storage unit in a well-known manner. Removable storage unit, represents a floppy disk, magnetic tape, optical disk, etc., which is read by and written to removable storage drive. As will be appreciated, the removable storage unit includes a computer usable storage medium having stored therein computer software and/or data.

Computer system can also include a communications interface. Communications interface allows software and data to be transferred between computer system and external devices. Examples of communications interface can include a modem, a network interface (such as an Ethernet card), a communications port, a Personal Computer Memory Card International Association (PCMCIA) slot and card, etc. Software and data transferred via communications interface are in the form of signals, which can be electronic, electromagnetic, optical or other signals capable of being received by communications interface. These signals are provided to communications interface via a communications path (e.g., channel). This path carries signals and can be implemented using wire or cable, fiber optics, a telephone line, a cellular link, a radio frequency (RF) link and/or other communications channels. The terms "computer program medium" and "computer usable medium" are used to refer generally to media such as a removable storage drive, a hard disk installed in a hard disk drive, and/or signals. These computer program products provide software to the computer system. Aspects described herein can be directed to such computer program products. Communications device can include communications interface.

Computer programs (also referred to as computer control logic) are stored in main memory and/or secondary memory. Computer programs can also be received via communications interface. Such computer programs, when executed, enable the computer system to perform various features in accordance with aspects described herein. In particular, the computer programs, when executed, enable the processor to perform such features. Accordingly, such computer programs represent controllers of the computer system.

In variations where aspects described herein are implemented using software, the software can be stored in a computer program product and loaded into computer system using removable storage drive, hard disk drive, or communications interface. The control logic (software), when executed by the processor, causes the processor to perform the functions in accordance with aspects described herein. In another variation, aspects are implemented primarily in hardware using, e.g., hardware components, such as application specific integrated circuits (ASICs). Implementation of the hardware state machine so as to perform the functions described herein will be apparent to persons skilled in the relevant art(s). In yet another example variation, aspects described herein are implemented using a combination of both hardware and software.

The foregoing disclosure of the preferred embodiments has been presented for purposes of illustration and description. It is not intended to be exhaustive or to limit the embodiments to the precise forms disclosed. Many variations and modifications of the embodiments described herein will be apparent to one of ordinary skill in the art in light of the above disclosure.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

Further, in describing representative embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the present embodiments.

The invention claimed is:

1. A method for modifying an appearance of graphical elements of an application in response to user behavior using a processor and machine-readable media including instructions which, when executed by the processor, cause the processor to perform steps of:
   displaying, during a user session of an application, a plurality of selectable icons at a first contrast level with zero color saturation, each selectable icon representing a link to a landing page for a specific product group of a company, the plurality of selectable icons including a first selectable icon;
   receiving, via the application, a first user input corresponding to a selection of the first selectable icon representing a first product group;
   automatically altering, in response to the first user input, an appearance of the first selectable icon from the first contrast level to a second contrast level, the second contrast level including color saturation; and
   maintaining the appearance of the first selectable icon at the second contrast level for the remainder of the user session regardless of subsequent user selections of other selectable icons of the plurality of selectable icons.

2. The method of claim 1, further comprising:
   receiving, via the application, a second user input corresponding to a selection of a second selectable icon representing a second product group; and
   automatically altering, in response to the second user input, an appearance of the second selectable icon from a third contrast level to a fourth contrast level, the fourth contrast level being greater than the third contrast level.

3. The method of claim 1, wherein the first selectable icon at the second contrast level has a first color corresponding to the color used by the company in the branding of the first product group.

4. The method of claim 2, wherein the second contrast level and the fourth contrast level are substantially similar.

5. The method of claim 2, wherein the first contrast level and the third contrast level are substantially similar.

6. The method of claim 1, wherein the plurality of selectable icons further includes a second selectable icon representing a second product group, and an appearance of the second selectable icon is maintained at a third contrast level prior to and subsequent to receiving the first user input, the third contrast level being less than the second contrast level.

7. The method of claim 6, wherein the third contrast level is substantially similar to the first contrast level.

8. The method of claim 1, wherein the plurality of selectable icons is arranged as a banner menu of product group options.

9. The method of claim 1, wherein the plurality of selectable icons further includes a second selectable icon representing a second product group for the company, and the method further comprises:
   automatically accessing an inventory profile for a first user account and determining that the inventory profile includes a first product associated with the second product group; and
   automatically adjusting, in response to determining the inventory profile includes the first product, an appearance of the second selectable icon such that the second selectable icon has a greater typographical emphasis than the first selectable icon.

10. A method for adjusting an appearance of graphical elements of an application in response to a user inventory profile using a processor and machine-readable media including instructions which, when executed by the processor, cause the processor to perform steps of:

receiving, via the application, a first user login for a first user account;

initiating a first access session in response to the first user login, the first access session linked to the first user account;

automatically accessing an inventory profile for the first user account and determining that the inventory profile includes a first product associated with a first product group of the company;

displaying a plurality of selectable icons, each selectable icon representing a link to a landing page for a specific product group of a company, the plurality of selectable icons including a first selectable icon corresponding to the first product group and a second selectable icon corresponding to a second product group;

automatically adjusting, in response to determining the inventory profile includes the first product, an appearance of the first selectable icon such that the first selectable icon has a greater typographical emphasis than the second selectable icon; and maintaining the change in typographical emphasis for as long as first user account indicates ownership of a product associated with the first product group.

11. The method of claim 10, wherein the inventory profile includes a second product and a third product associated with a third product group of the company, the plurality of selectable icons also includes a third selectable icon corresponding to the third product group, and the method further comprises adjusting an appearance of the third selectable icon such that the third selectable icon has a greater typographical emphasis than the second selectable icon.

12. The method of claim 10, further comprising:

receiving, via the application, a first user input corresponding to a removal of the first product from the inventory profile; and automatically altering, in response to the first user input, an appearance of the first selectable icon such that the second selectable icon and the first selectable icon have a substantially similar typographical emphasis.

13. The method of claim 10, wherein the first selectable icon has a bold type face and the second selectable icon has a regular type face.

14. The method of claim 10, further comprising:

receiving, via the application, a first user input corresponding to a selection of the first selectable icon representing a first product group; and automatically altering, in response to the first user input, an appearance of the first selectable icon from a first contrast level with zero color saturation to a second contrast level including color saturation, the second contrast level being greater than the first contrast level.

15. A system for adjusting an appearance of graphical elements of an application in response to user behavior, the system comprising a processor and machine-readable media including instructions which, when executed by the processor, cause the processor to:

display, during a user session of the application, a plurality of selectable icons at a first contrast level with zero color saturation, each selectable icon representing a link to a landing page for a specific product group of a company, the plurality of selectable icons including a first selectable icon;

receive, via the application, a first user input corresponding to a selection of the first selectable icon representing a first product group;

automatically alter, in response to the first user input, an appearance of the first selectable icon from the first contrast level to a second contrast level, the second contrast level including color saturation; and maintain the appearance of the first selectable icon at the second contrast level for the remainder of the user session regardless of subsequent user selections of other selectable icons of the plurality of selectable icons.

16. The system of claim 15, wherein the first selectable icon at the second contrast level has a first color corresponding to the color linked to the branding of the first product group.

17. The system of claim 15, wherein the instructions further cause the processor to:

receive, via the application, a second user input corresponding to a selection of a second selectable icon representing a second product group; and automatically alter, in response to the second user input, an appearance of the second selectable icon from a third contrast level to a fourth contrast level, the fourth contrast level being greater than the third contrast level.

18. The system of claim 17, wherein the second contrast level and the fourth contrast level are substantially similar.

19. The system of claim 17, wherein the first contrast level and the third contrast level are substantially similar.

20. The system of claim 15, wherein the plurality of selectable icons further includes a second selectable icon representing a second product group for the company, and wherein the instructions further cause the processor to:

automatically access an inventory profile for a first user account and determine that the inventory profile includes a first product associated with the second product group; and automatically adjust, in response to determining the inventory profile includes the first product, an appearance of the second selectable icon such that the second selectable icon has a greater typographical emphasis than the first selectable icon.

\* \* \* \* \*